May 3, 1927.
G. WOOD
1,627,301
SCREW DRIVER
Filed Sept. 2, 1924
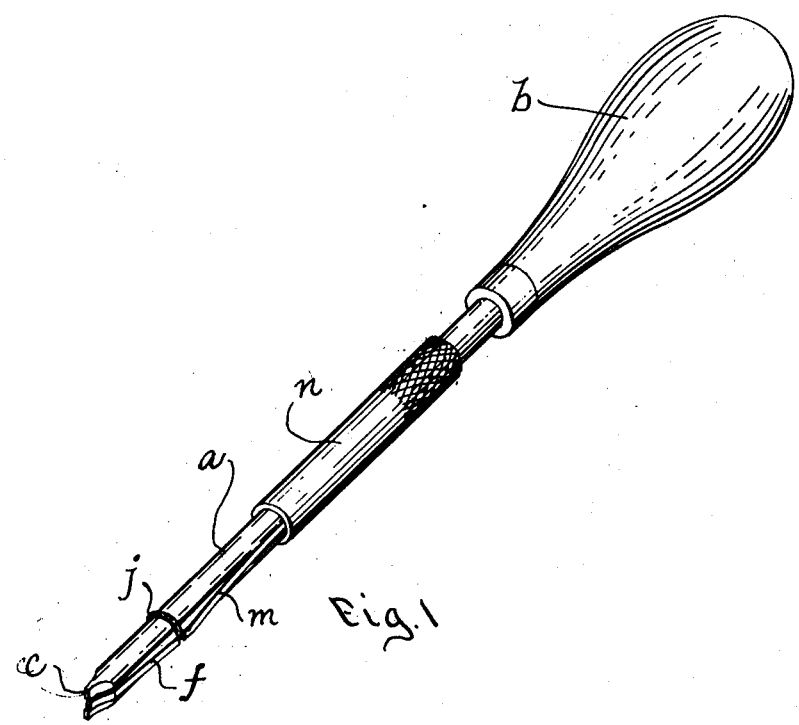
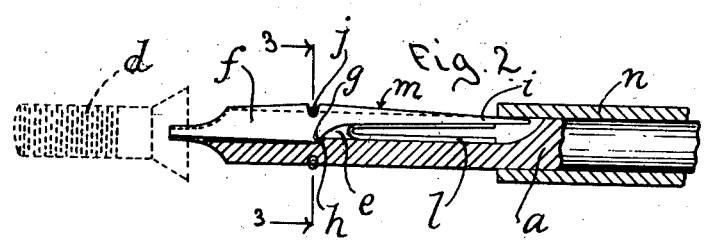
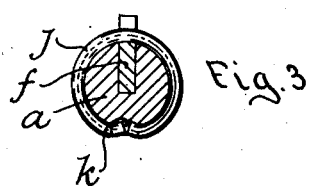
INVENTOR
Gleason Wood
by Wright, Brown, Quinby & May
att'ys Patented May 3, 1927.

1,627,301

UNITED STATES PATENT OFFICE.

GLEASON WOOD, OF WALTHAM, MASSACHUSETTS.

SCREW DRIVER.

Application filed September 2, 1924. Serial No. 735,327.

The present invention relates to screw drivers and its object is to provide a screw driver with means for holding or gripping a screw before and while being driven, or after retraction from the place in which it had been previously set. A further object is to provide a screw holding equipment for screw drivers of simple character and consisting of few parts and those such as can be made and assembled at small cost and can be easily manipulated to grip and release the screw.

In the drawings,—

Figure 1 is a perspective view of a screw driver embodying the preferred form of the invention.

Figure 2 is a longitudinal section of the parts of the screw driver in which the invention is particularly embodied.

Figure 3 is a cross section on line 3—3 of Figure 2 drawn on an enlarged scale.

Like reference characters designate the same parts in all the figures.

The screw driver comprises a shank $a$ to which a handle $b$ may be attached, the end of the shank being flattened or cut away at the sides to form a blade $c$ adapted to enter the slot of a screw, as shown in Figure 2, where the screw is shown at $d$ in dotted lines. The shank and blade may have any of the forms common in screw drivers, but I prefer to make the blade with a shorter taper than usual, continuing the shank to its full diameter or thickness nearly to the outer end; in other words, to draw down the blade portion with a shorter and more abrupt taper than in the usual practice in order to leave stock for mounting and housing the screw gripper and to strengthen the blade.

In the shank there is cut or otherwise formed a slot $e$ at right angles to the central plane of the blade, or nearly so, intersecting the blade and extending back therefrom for a suitable distance. In this slot is located a piece $f$, which, for the convenience of this description, I call a "screw gripper." It is a thin, flat piece of steel, or other suitable material, of a thickness which adapts it to fit closely but not tightly in the slot, that is, it is movable freely in the slot, but without too great looseness. The outer end of this gripper runs to the outer end of the blade, and its outline is like the cross section of the blade in order that it may substantially coincide with the opposite sides of the blade when not performing its gripping function. This gripper is formed on its lower or inner edge, that is, the edge which comes next to the bottom of the slot, with an angle or protuberance $g$ which rests on a shoulder $h$ in the bottom of the slot and serves as a fulcrum about which the blade may rock as on a pivot. It is also formed with a tail-piece $i$ running back from the blade.

The upper or outer edge of the gripper opposite to the fulcrum angle projects out of the slot, and is there provided with a notch or equivalent opening, and an encircling groove is formed in the exterior of the shank; such notch and groove being adapted to receive a retaining ring $j$, and being approximately in the same plane with the fulcrum $g$. This retaining ring is conveniently made of wire bent into a circle of such diameter that it can be sprung over the end of the shank and will snap into the holding groove. The ends of the wire forming the ring may then be bent into a socket $k$ in the side of the shank for the double purpose of preventing the ring from slipping around on the shank and of putting the cut ends of the wire out of the way where they will not be liable to catch on anything. It will thus be seen that the ring is a resilient lock which holds the gripper in place, resiliently holding its fulcrum projection against the complemental abutment shoulder and positively preventing endwise movement of the gripper in either direction.

That part $m$ of the upper edge of the gripper which runs from the retaining ring to the end of the tail-piece projects out of the slot adjacent to the ring, but it always is within the slot at the other end. It is arranged on an incline or taper with respect to the adjacent surface of the shank and serves as a cam, as will presently be described.

A spring $l$ situated in the slot underneath the tail-piece bears on the latter and tends to force it out of the slot, but the outer end part of the gripper, coming to bear on the bottom of the slot in front of the retaining ring, limits this movement so that the tail-piece is always within the slot, or at least far enough within it to permit the operating sleeve $n$ to pass over it. The spring $l$ is conveniently made from a piece of spring wire bent double and of such dimensions that it will lie in the slot substantially as shown in Figure 2 with the effect as above described.

The operating sleeve n above mentioned is a sleeve which surrounds the shank and is adapted to slide freely thereon. It is shorter than the distance between the gripper and the handle b, or at least short enough so that when moved as far as possible toward the handle, it will leave the gripper free to be placed by its spring in the position where its outer or front end registers with the blade. In this condition the blade may be entered into the slot of a screw.

In order to grip the screw which has thus been engaged by the screw driver, the user slides the operating sleeve toward the blade. The advancing end of the sleeve n bears on the cam surface m and crowds the tail of the gripper into the slot, thus causing the outer end of the gripper to swing outward from the blade and to press on one wall of the screw slot, causing the other wall of the slot to bear on the other side of the blade. A very powerful pressure can thus be exerted between the blade and the gripper on the one hand and the walls of the screw slot on the other hand, on account of the long and gradual incline of the cam surface m. Thus the screw can be firmly held by the screw driver and the latter may be used to place and drive a screw in an otherwise inaccessible position and to remove a screw from such a position. This connection between the tool and the screw is of advantage also in many other situations.

In the foregoing description I have used the words "outer" and "front" to designate position at, near or toward the blade and away from the handle end of the screw driver. I have used the words "lower" and "upper" and words of similar import to designate the relation of the gripper to its containing slot, that is, whether near the bottom or the opening of the slot, and without any reference to the relation of these parts to the surface of the earth.

Various modifications and reversals of the several parts of this apparatus may be made within the spirit of my invention and the scope of the appended claims. For instance it is within my contemplation to connect the gripper to the shank by means of a pivot pin instead of by the specific pivotal connection here shown, to form the tail of the gripper as a spring performing the functions of the spring l, and to rearrange the pivot mounting of the gripper in such fashion with respect to the spring that the spring will cause the gripper to grasp the screw and the operating sleeve be employed to release it.

In this specification, as will have been already apparent, the terms "gripped," "gripper" and "grasp" are used with a meaning which includes a spreading motion of the gripping elements within the member which they grip. In other words these words are to be construed for the purposes of this invention in conformity with the illustration in the drawing.

The particular embodiment of the invention herein shown involves a minimum of complexity in construction and operation and a minimum in cost of production. The only essential modification in the structure of the screw driver shank itself, in comparison with the ordinary screw driver, is the formation of the slot e. The additional parts are only three in number and those are of simple construction capable of assembly by first placing the sleeve over the shank, then placing the gripper in the slot, and finally snapping the retaining ring over the shank and gripper. The final step of bending in the ends of the ring is a useful but non essential refinement.

What I claim and desire to secure by Letters Patent is:

1. A gripping screw driver comprising a shank having a blade at one end and a longitudinal slot in one side intersecting the blade, a gripper piece fitted in said slot to have a rocking engagement with the bottom of the slot and formed at its outer end to register with the blade, a snap ring encircling said shank and engaged with the gripper to hold it in place, and means acting on said gripper for moving its outer end laterally from the blade to grip a screw, into the slot of which said blade is entered.

2. A gripping screw driver comprising a shank reduced in one end to form a screw driver blade and having in one side a groove transverse to such blade, which groove extends to the extremity of and subdivides the blade, a gripper piece fitted freely in said groove and having a projection on its inner edge adapted to bear against and rock on the bottom of said groove, the extremity of said gripper having an outline conforming to the outline of the blade in cross section and adapted to coincide therewith, a band surrounding said shank and interlocked with the gripper approximately in the same plane with said fulcrum projection, and means for rocking the gripper about said projection.

In testimony whereof I have affixed my signature.

GLEASON WOOD.